Feb. 10, 1970     R. D. WILSON     3,495,199
EMERGENCY SWITCH FOR VEHICLES
Filed Aug. 5, 1968
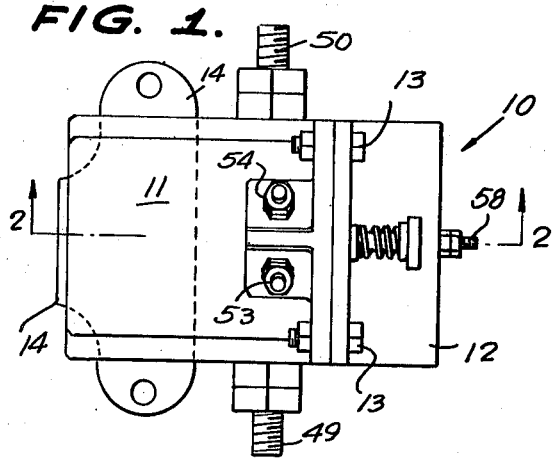
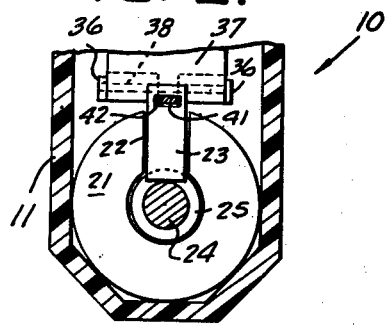
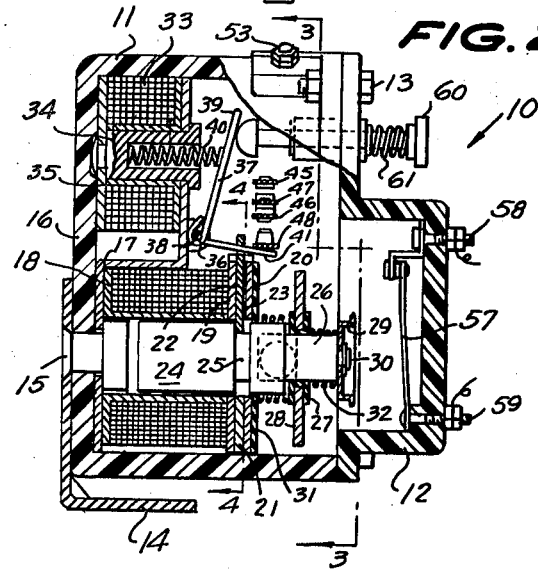
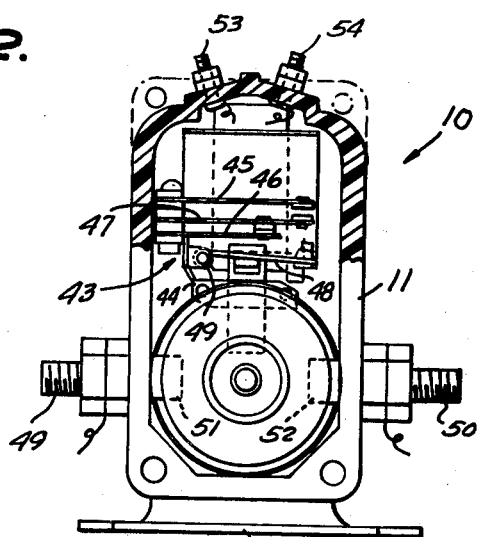
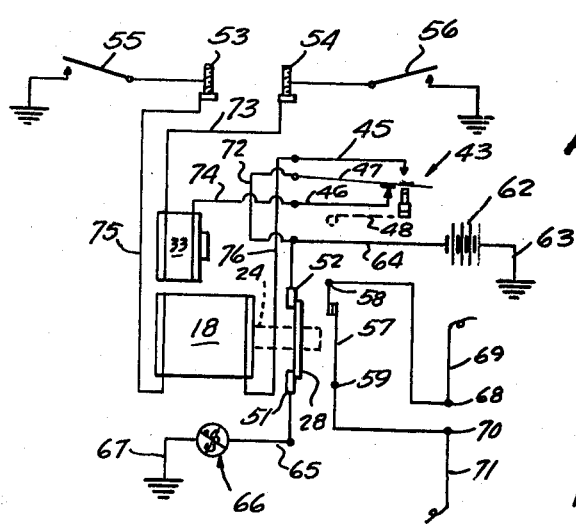
INVENTOR.
REGINALD D. WILSON,
BY
*Kimmel, Crowell & Weaver*
ATTORNEYS.

United States Patent Office 3,495,199
Patented Feb. 10, 1970

3,495,199
EMERGENCY SWITCH FOR VEHICLES
Reginald D. Wilson, 2601 Roslyn Ave.,
Baltimore, Md. 21216
Filed Aug. 5, 1968, Ser. No. 750,249
Int. Cl. H01h 9/20
U.S. Cl. 335—170                                    7 Claims

ABSTRACT OF THE DISCLOSURE

An emergency safety switch for vehicles in which a solenoid armature is moved to circuit making position by energization of the solenoid and is locked in the position when deenergized to maintain the circuit under normal operating conditions. An electromagnet is arranged upon energization to unlock the armature of the solenoid and release it to permit it to move under spring bias to a circuit breaking position.

---

The present application is an improvement on my Patent No. 3,229,109, issued Jan. 11, 1966, entitled "Emergency Switch," and my Patent No. 3,396,352, issued Aug. 6, 1968, entitled "Safety Switch for Vehicles."

The present invention is an emergency safety switch for vehicles for instantaneously cutting off all power from the battery to all accessories, starter, and engine of a motor vehicle while simultaneously breaking a second circuit extending from an alternator to the engine.

The primary object of the invention is to provide a snap acting emergency safety switch for vehicles which can be actuated from switches installed convenient to the driver of the motor vehicle and may be operated additionally by switches actuated by overturn of the vehicle.

Other objects and advantages will become apparent in the following specification when considered in light of the attached drawings, in which:

DESCRIPTION OF DRAWINGS

FIGURE 1 is a top plan view of the invention;

FIGURE 2 is a vertical cross-section taken along the line 2—2 of FIGURE 1 looking in the direction of the arrows;

FIGURE 3 is a fragmentary vertical cross-section taken on the line 3—3 of FIGURE 2 looking in the direction of the arrows with the cover removed;

FIGURE 4 is a fragmentary vertical cross-section taken alone the line 4—4 of FIGURE 2 looking in the direction of the arrows with parts broken away for convenience of illustration; and FIGURE 5 is a diagrammatic view of a circuit illustrating the preferred connection of the emergency switch into a motor vehicle circuit.

Referring now to the drawings in detail, wherein like reference characters indicate like parts throughout the several figures, the reference numeral 10 indicates generally an emergency safety switch for vehicles constructed in accordance with the invention.

The emergency safety switch 10 includes a hollow housing 11 formed of electrical insulating material and open along one vertical face. A cover 12 is secured to the housing 11 by a plurality of bolts 13 to close the housing and seal it against dirt and water.

An angle bracket 14 is secured to the housing 11 by a steel rivet 15 which extends through the rear wall 16 thereof and secures a mounting plate 17 to the rear wall 16 within the housing 11.

A hollow electric solenoid 18 is positioned within the housing 11 adjacent the lower edge thereof and is secured to the mounting plate 17 as can be best seen in FIGURE 2. A pair of spaced apart opposed plates 19, 20 are mounted on opposite sides of a spacer 21 to form a vertically extending aperture 22 which slidingly mounts a latch bar 23.

A cylindrical armature 24 is mounted in the solenoid 18 and is arranged to reciprocate therein. The armature has a circumferential groove 25 formed therein to cooperate with the latch bar 23 so as to lock the armature 24 in its innermost position within the solenoid 18. The armature 24 has a reduced outer end portion 26 formed thereon to slidingly receive an insulating channel washer 27 in which is mounted a heavy copper washer 28. A dished element 29 is secured to the outer end of the armature 24 by means of a stud 30. A coil spring 31 surrounds the armature 24 and engages the channel washer 27 at one end and the plate 20 at its opposite end to normally urge the armature 24 away from the solenoid 18. A second coil spring 32 extends between the channel washer 27 and the member 29 to normally urge the channel washer 27 and copper washer 28 in a direction toward the solenoid 18.

An electromagnet 33 is positioned in the upper portion of the housing 11 and is secured to the mounting plate 17 by means of a core 34 extending therethrough. The core 34 has a bore 35 centrally positioned therein and opening into the interior of the housing 11.

A pair of ears 36 are struck from the mounting plate 17 above the solenoid 18 and are arranged in spaced apart parallel relation. A bell crank 37 is mounted between the ears 36 and is pivotally secured therein by a pivot pin 38. The bell crank 37 has a relatively wide upstanding leg 39 which is positioned in confronting relation to the core 34 of the electromagnet 33 and is adapted to be drawn toward the core 34 upon energization of the electromagnet 33. A spring 40 is mounted in the bore 35 and engages against the leg 39 to normally urge the leg 39 away from the electromagnet 33. A relatively narrow horizontal leg 41 is formed on the bell crank 37 and extends forwardly through a slot 42 formed in the latch bar 23. The leg 41 of the bell crank 37 is arranged to withdraw the latch bar 23 from the groove 25 when the electromagnet 33 is energized. A multiple switch generally indicated at 43 is mounted on a bracket 44 extending upwardly from the plate 20, as can be seen in FIGURE 3. The multiple switch 43, while shown as an open switch, may be a conventional snap switch such as that shown in Patent No. 2,854,540 to Cunningham, issued Sept. 30, 1958, entitled "Electric Switch" (FIGURE 2).

The switch 43 has an upper contact bar 45, a lower contact bar 46, and a swinging contact bar 47 positioned between the upper contact bar 45 and the lower contact bar 46. An actuating bar 48 is pivotally mounted to the bracket 44 by pivot pin 49 and is arranged in engagement with the leg 41 of the bell crank 37 so as to be moved upwardly thereby as the bell crank 37 swings inwardly toward the electromagnet 33. The contacts of contact bar 46 and swinging contact bar 47 are normally engaged to provide a circuit therebetween and the actuating bar 48 is arranged upon upward movement to engage the swinging contact bar 47 and break the electric contact with bar 46 and make electric contact with bar 45.

Heavy duty terminals 49, 50 extend through the opposite side walls of the housing 11 and have contact heads 51, 52, respectively, positioned to be engaged by the washer 28 to complete a circuit between the terminals 49, 50. Additional terminals 53, 54 extend through the top of the housing 11 and are electrically connected, respectively, to the solenoid 18 and electromagnet 33. The terminals 53, 54 are electrically connected to a switch 55 and 56, respectively, for reasons to be assigned. A spring switch 57 is secured to the cover 12 in alined relation to the armature 24 and is arranged to be engaged by the member 29 to break the circuit of the switch 57 upon the full outward movement of the armature 24. The switch 57 is secured to the cover 12 by terminal bolts 58, 59, as can be seen in FIGURE 2.

A band operated plunger 60 is mounted in the cover 12 and arranged for engagement with the wide leg 39 of the bell crank 37 so that inward movement of the plunger 60 moves the bell crank 37 the same as would the energization of the electromagnet 33. A coil spring 61 normally maintains the plunger 60 in its outermost position.

Referring now to FIGURE 5, a vehicle battery is indicated at 62 and is provided with a conventional ground cable 63 extending to ground. A power cable 64 extends from the battery 62 and is connected to the contact 52. A second power cable 65 extends from the contact 51 to all of the other electrical elements of the automobile normally serviced by the power cable 64, with these elements indicated generally at 66. A cable 67 extends from the element 66 to ground to complete the circuit.

The switch 57 and its terminal 58 is connected to a terminal 68 of a cable 69. The terminal 59 of the switch 57 is connected to a terminal 70 of a cable 71. The cables 69, 71 are normally joined at the contacts 68, 70 and extend between two points in the ignition system of a motor vehicle (not shown) and normally provide electricity for the ignition system from the alternator even when the battery 62 is completely disconnected and removed from the vehicle so long as the motor is permitted to run. In order that the safety switch 10 stop the operation of the engine of the motor vehicle, it is essential that the circuit of the ignition system be broken.

A wire 72 exends from the cable 64 to the swinging contact bar 47 of the switch 43. A wire 73 extends from one side of the electromagnet 33 to the terminal 54, and a second wire 74 extends from the opposite side of the electromagnet 33 to the lower contact bar 46. A wire 75 extends from one side of the solenoid 18 to the terminal 53 and a wire 76 extends from the opposite of the solenoid 18 to the upper contact bar 45.

In the use and operation of the invention, the switches 55, 56, normally of the pushbutton type, normally open so that, under normal operation of the device, no current will be flowing through the solenoid 18 or the electromagnet 33. Presume at the start that the armature 24 is in its retracted position with the switch 57 closed and the washer 28 in contact with the contacts 51, 52. In this position, the pushbutton 56 is depressed, energizing the electromagnet 33 since the contacts of the contact bar 46 and the swinging contact bar 47 are engaged connecting the electromagnet 33 to the battery. Immediately upon energization of the electromagnet 33, the bellcrank 37 moves to the left against the electromagnet 33 releasing the armature 24 which moves the washer 28 out of engagement with the contacts 51, 52 and opens the switch 57. In this position, all of the electric elements 66 have electric energy thereto cutoff, even should their own individual switches (not shown) be operated, and the cable 69 is disconnected from the cable 71 so that current cannot flow through the ignition system. With the parts in this position, the engine and the vehicle cannot be operated.

The latch bar 23 rides on the surface of the armature 24 and thus stays in its upward extended position maintaining the actuator bar 48 in its uppermost position and hence maintains the swinging contact bar 47 out of contact with the contact bar 46 and in engagement with the contact bar 45. In this position the circuit to the solenoid 18 is established through the switch 43 so that upon closing the switch 55 by the driver the solenoid 18 is energized and the armature 24 moves to the left and the latch bar 23 drops into the groove 25 locking the armature 24 in retracted position. The washer 28 is thus in engagement with the contacts 51, 52 and the switch 57 is closed. As the latch bar 23 drops down the actuator arm 48 drops and the swinging contact 47 moves into contact with the contact bar 46 to again establish the circuit for the electromagnet 33.

A gravity operated switch (not shown) may be used in parallel with the switch 56 so that the electromagnet 33 will be energized when the vehicle overturns.

Having thus described the preferred embodiment of the invention, it should be understood that numerous structural modifications and adaptations may be resorted to without departing from the spirit of the invention.

What is claimed is:

1. An emergency safety switch for vehicles comprising
a housing,
a solenoid mounted in said housing,
an armature slidably mounted in said solenoid and having a circumferential groove formed therein intermediate the opposite ends thereof,
a pair of contacts secured to said housing on opposite sides of said armature,
a washer resiliently mounted on said armature and adapted to engage said contacts in one position of said armature to complete a circuit therebetween,
an electromagnet mounted in said housing adjacent said solenoid,
a bell crank pivotally mounted in confronting relation to said electromagnet with said bell crank being adapted to be moved into engagement with said electromagnet upon energization of said electromagnet,
means normally urging said bell crank away from said electromagnet,
a latch bar slidably mounted in said solenoid and adapted for engagement in the groove of said armature in its lowermost position, said latch bar connected to said bell crank so that movement of said bell crank toward said electromagnet simultaneously moves said latch bar out of the groove in said armature,
a switch actuated by said bell crank, said switch selectively closing a circuit to said electromagnet and to said solenoid, and
means for selectively energizing said electromagnet to release said armature to break the circuit between said contacts, and
means to energize said solenoid to move said armature into a position to engage said washer with said contacts.

2. The structure as claimed in claim 1 wherein a switch is mounted on said housing for engagement by said armature to open said switch at the outermost movement of said armature.

3. The structure as claimed in claim 1 wherein hand controlled means are provided for moving said bell crank into engagement with said electromagnet in the event of the complete loss of electric power.

4. The device as claimed in claim 1 wherein resilient means are provided for normally urging said armature out of said solenoid.

5. The device as claimed in claim 1 wherein said latch bar engages the circumference of said armature when said armature is in extended position and thereby supports said latch bar in its uppermost position with said bell crank supported in its position in contact with said electromagnet.

6. An emergency safety switch for vehicles comprising
a housing,
a solenoid mounted in said housing,
an armature slidably mounted in said solenoid and spring biased toward extended position,
a pair of contacts secured to said housing on opposite sides of said armature,
means on said armature for establishing electrical connection between said contacts with said armature retracted and breaking connection between said contacts with said armature extended,
an electromagnet mounted in said housing adjacent said solenoid, a single pole double throw switch in said housing, means actuated by said electromagnet for latching said armature in retracted position and releasing said armature for movement to extended position, said last named means simultaneously actuating said single pole double throw switch to selectively direct the flow of current to said electromagnet and to said solenoid, a hand controlled switch connected in the circuit of each of said solenoid and said electromagnet to selectively operate said safety switch, and hand controlled means on said housing for actuating said armature latching and releasing means.

7. The structure as claimed in claim 6 wherein a switch is mounted on said housing for engagement by said armature to open said switch at the outermost movement of said armature.

References Cited

UNITED STATES PATENTS

| | | | |
|---|---|---|---|
| 3,229,109 | 1/1966 | Wilson | 335—170 |
| 3,304,444 | 2/1967 | Smith | 335—170 |
| 3,396,352 | 8/1968 | Wilson | 335—170 |

BERNARD A. GILHEANY, Primary Examiner

H. BROOME, Assistant Examiner